(12) United States Patent
Arguelles et al.

(10) Patent No.: US 11,351,578 B2
(45) Date of Patent: Jun. 7, 2022

(54) RADIATION HARDENED ULTRASONIC CLEANING SYSTEM

(71) Applicant: DOMINION ENGINEERING, INC., Reston, VA (US)

(72) Inventors: David Arguelles, Herndon, VA (US); Abby Margaret Pellman, Aldie, VA (US); Florian Weber, Eisingen (DE)

(73) Assignee: DOMINION ENGINEERING, INC., Reston, VA (US)

( * ) Notice: Subject to any disclaimer, the term of this patent is extended or adjusted under 35 U.S.C. 154(b) by 0 days.

(21) Appl. No.: 16/099,433

(22) PCT Filed: May 24, 2017

(86) PCT No.: PCT/IB2017/053067
§ 371 (c)(1),
(2) Date: Nov. 6, 2018

(87) PCT Pub. No.: WO2017/203451
PCT Pub. Date: Nov. 30, 2017

(65) Prior Publication Data
US 2019/0217345 A1    Jul. 18, 2019

Related U.S. Application Data

(60) Provisional application No. 62/341,452, filed on May 25, 2016.

(51) Int. Cl.
*B08B 3/12*    (2006.01)
*G21F 9/00*    (2006.01)
(Continued)

(52) U.S. Cl.
CPC ................ *B08B 3/12* (2013.01); *G21C 17/06* (2013.01); *G21F 9/001* (2013.01); *G21F 9/004* (2013.01); *G21F 9/28* (2013.01); *B08B 2203/002* (2013.01)

(58) Field of Classification Search
None
See application file for complete search history.

(56) References Cited

U.S. PATENT DOCUMENTS

| 4,071,376 A | 1/1978 | McNeer |
| 6,396,892 B1 | 5/2002 | Frattini et al. |
| (Continued) | | |

FOREIGN PATENT DOCUMENTS

| CA | 2369950 | 10/2000 |
| CN | 1639558 | 7/2005 |
| (Continued) | | |

OTHER PUBLICATIONS

English Machine Translation of CN-102393216-A.*
(Continued)

*Primary Examiner* — Mikhail Kornakov
*Assistant Examiner* — Pradhuman Parihar
(74) *Attorney, Agent, or Firm* — Pillsbury Winthrop Shaw Pittman LLP (57) ABSTRACT

In a submersible ultrasonic cleaning system for use in highly radioactive environments (e.g., cleaning radiated nuclear fuel assemblies), a bond between energy producing transducers and an radiating wall is strengthened with a polyurethane adhesive such as Permabond PT326, or 3M DP-190 adhesive. In various diagnostic tests, one or more of the transducers are operated in an energy-transmitting mode while one or more other transducers are operated in an energy-detecting mode to detect a weakened transducer/wall bond and/or acoustic conditions of the working fluid.

19 Claims, 3 Drawing Sheets

(51) Int. Cl.
  *G21F 9/28* (2006.01)
  *G21C 17/06* (2006.01)

(56) References Cited

U.S. PATENT DOCUMENTS

| | | | |
|---|---|---|---|
| 8,372,206 B2 | 2/2013 | Gross et al. | |
| 2002/0163990 A1* | 11/2002 | Frattini | G21C 19/32 |
| | | | 376/308 |
| 2006/0107975 A1 | 5/2006 | Arguelles et al. | |
| 2007/0023064 A1* | 2/2007 | Gilbert | A61L 2/025 |
| | | | 134/1 |
| 2009/0241985 A1* | 10/2009 | Gross | B08B 3/12 |
| | | | 134/1 |
| 2013/0058448 A1 | 3/2013 | Smith et al. | |

FOREIGN PATENT DOCUMENTS

| | | | |
|---|---|---|---|
| CN | 102393216 A | * | 3/2012 |
| CN | 102393216 A | | 3/2012 |
| JP | S58-097699 A | | 6/1983 |
| JP | 63-9900 S | | 1/1988 |
| JP | 2002-541495 A | | 12/2002 |
| JP | 2008-515612 A | | 5/2008 |
| JP | 2008-309754 A | | 12/2008 |
| JP | 2009-227938 A | | 10/2009 |
| JP | 2013-170856 | | 9/2013 |
| WO | 2011075831 A2 | | 6/2011 |
| WO | 2014144315 A1 | | 9/2014 |

OTHER PUBLICATIONS

Permabond Engineering Adhesives: Apr. 13, 2010; pp. 1-2.*
3M Scotch-Weld Epoxy Adhesives: Feb. 2016; pp. 1-7.*
Elaine Cristina Azevedo, et al., "Gamma radiation effects on mechanical properties and morphology of a polyurethane derivate from castor oil, Radiation Effects and Defects in Solids," U.K., Taylor and Francis, Nov. 9, 2010, vol. 166, Issue 3, pp. 208-214.
Kenichi Somekawa, "Selection of Medical Device Materials for Radiation Sterilization," Radioisotopes, Japan, Japan Radioisotope Association, Feb. 15, 2006, vol. 55, No. 2, pp. 97-107.
Office Action dated Oct. 29, 2019 in corresponding Japanese Patent Application No. 2018-550372, 11 pages.
International Search Report and Written Opinion of the International Search Authority issued in related PCT Application No. PCT/IB2017/053067 dated Feb. 13, 2018, 16 pages.
Notice of Preliminary Rejection issued in corresponding Korean Patent Application No. 10-2018-7028048, dated Mar. 25, 2020.
Notice of Allowance issued in corresponding Korean Patent Application No. 10-2018-7028048, dated Feb. 22, 2021.
Jet Propulsion Laboratory, California Institute of Technology, Radiation Data for Design and Qualification of Nuclear Plant Equipment, EPRI, Aug. 1985.
Zhou, Chun-lin et al., "Ten year operation review of a set of low background anti-Compton HPGey spectrometers," Nuclear Electronics and Detection Technology, vol. 26, No. 3, published on May 31, 2006.
First Office Action issued in corresponding Chinese Patent Application No. 201780021173.3, dated Dec. 31, 2021.

* cited by examiner

RADIATION HARDENED ULTRASONIC CLEANING SYSTEM

CROSS REFERENCE TO PRIOR APPLICATIONS

This application is a U.S. national phase of International Patent Application No. PCT/IB2017/053067, filed on May 24, 2017, titled, "RADIATION HARDENED ULTRASONIC CLEANING SYSTEM," which claims the benefit of priority from U.S. Provisional Patent Application No. 62/341,452, filed May 25, 2016, titled "Ultrasonic Cleaning," the entire contents of which are hereby incorporated by reference herein.

BACKGROUND

1. Field of the Invention

Various embodiments relate generally to an apparatus and method for ultrasonically cleaning a nuclear fuel assembly.

2. Description of Related Art

A number of ultrasonic cleaning systems have been developed for cleaning irradiated nuclear fuel assemblies. Examples of such ultrasonic cleaning systems are described, for example, in U.S. Pat. Nos. 6,396,892 and 8,372,206, the entire contents of which are incorporated herein by reference in their entirety.

SUMMARY

One or more non-limiting embodiments provide a submersible ultrasonic cleaning system that includes a frame assembly with inner walls. A cleaning zone is disposed inwardly of the inner walls and is configured to accommodate a nuclear fuel assembly therein. The system includes a plurality of ultrasonic transducers, each of which is bonded to one of the inner walls with a polyurethane adhesive (e.g., a radiation-hardened adhesive, Permabond PT326) or 3M DP-190 adhesive to form a plurality of radiating surfaces. The radiating surfaces are arranged to transmit ultrasonic energy from the transducers into the cleaning zone.

According to one or more of these embodiments, the plurality of transducers are configured to transmit a bulk power density to the cleaning zone of at least 10 watts/gallon.

According to one or more of these embodiments, the frame assembly further includes a plurality of outer walls that connect to the inner walls and enclose the plurality of transducers in a water-tight transducer zone disposed between the inner and outer walls.

According to one or more of these embodiments, the cleaning system is disposed in a submerged environment of a nuclear power plant.

One or more non-limiting embodiments provide a method for diagnosing energy transmission degradation in a system that utilizes a plurality of ultrasonic transducers to transmit ultrasonic energy into a working fluid. The method includes: in a first diagnostic test, operating a first one of the plurality of transducers in one of an energy-transmitting mode while operating a second one of the transducers in an energy-detecting mode; in a second diagnostic test, operating the first one of the plurality of the transducers in the energy-detecting mode while operating a third one of the plurality of the transducers in the energy-transmitting mode; and analyzing electrical signals transmitted by (1) the second transducer during the first diagnostic test, and (2) the first transducer during the second diagnostic test to identify a reduction in a capability of at least one of the transducers to deliver ultrasonic energy into the working fluid.

According to one or more of these embodiments, the second and third ones of the transducers are the same transducer.

According to one or more of these embodiments, the method further includes, before the first and second diagnostic tests, using the system in a cleaning cycle to clean an object, said use including operating the plurality of ultrasonic transducers in the energy-transmitting mode to transmit ultrasonic energy into the working fluid so as to clean the object that is at least partially disposed in the working fluid.

According to one or more of these embodiments, the second and third ones of the transducers are different transducers.

According to one or more of these embodiments, the method further includes indicating to a user the reduction in the capability of the at least one of the transducers to transmit ultrasonic energy into the working fluid.

According to one or more of these embodiments, the method further includes, in response to said indicating, correcting a problem revealed by the indicating so as to increase an amount of energy that the system is capable of delivering to the working fluid.

According to one or more of these embodiments, the method further includes operating the plurality of transducers so as to provide a bulk power density to the cleaning zone of at least 10 watts/gallon.

One or more non-limiting embodiments provide a method for diagnosing energy transmission degradation in a system that utilizes a plurality of ultrasonic transducers to transmit ultrasonic energy into a working fluid. The method includes: conducting a series of diagnostic tests by simultaneously operating one or more of the plurality of ultrasonic transducers in an energy-transmitting mode while operating a different one or more of the plurality of ultrasonic transducers in an energy-detecting mode, and changing an operating mode of at least one of the transducers from the energy-transmitting to the energy-detecting mode and/or from the energy-detecting mode to the energy-transmitting mode. The method also includes analyzing electrical signals transmitted by transducers when operated in the energy-detecting mode during the series of diagnostic tests to identify a reduction in a capability of at least one of the transducers to deliver ultrasonic energy into the working fluid.

One or more non-limiting embodiments provide an ultrasonic system that includes: a frame; a plurality of ultrasonic transducers attached to the frame and arranged to transmit ultrasonic energy into a working fluid; and a transducer monitor operatively connected to each of the plurality of ultrasonic transducers. The monitor is configured to alternately operate selected ones of the transducers in energy-transmitting and energy-detecting modes and analyze electric signals transmitted by the transducers being operated in the energy-transmitting mode so as to identify a reduction in a capability of at least one of the transducers to deliver ultrasonic energy into the working fluid.

According to one or more of these embodiments, the monitor includes an output device configured to indicate to a user the reduction in the capability of at least one of the transducers to deliver ultrasonic energy into the working fluid.

One or more non-limiting embodiments provide an ultrasonic system that includes: a frame; a plurality of ultrasonic transducers attached to the frame and arranged to transmit ultrasonic energy into a working fluid; and a transducer monitor operatively connected to each of the plurality of ultrasonic transducers. The monitor is configured to operate a first subset of one or more of the transducers in an energy-transmitting mode while operating a second subset of one or more of the transducers in an energy-detecting mode. The monitor is configured to analyze electric signals transmitted by the second subset so as to identify an acoustic condition of the working fluid affecting transmission of ultrasonic power through the working fluid.

According to one or more of these embodiments, the monitor includes an output device configured to indicate to a user the acoustic condition.

According to one or more of these embodiments, the acoustic condition includes a dissolved gas concentration in the working fluid, a temperature of the working fluid, a hydrostatic pressure of the working fluid, a suspended particulate loading in the working fluid, or a fluid property of the working fluid.

One or more of these and/or other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

All closed-ended (e.g., between A and B) and open-ended (greater than C) ranges of values disclosed herein explicitly include all ranges that fall within or nest within such ranges. For example, a disclosed range of 1-10 is understood as also disclosing, among other ranges, 2-10, 1-9, 3-9, etc.

BRIEF DESCRIPTION OF THE DRAWINGS

For a better understanding of various embodiments as well as other objects and further features thereof, reference is made to the following description which is to be used in conjunction with the accompanying drawings, where.

DETAILED DESCRIPTION OF EXEMPLARY EMBODIMENTS

Figure 1:
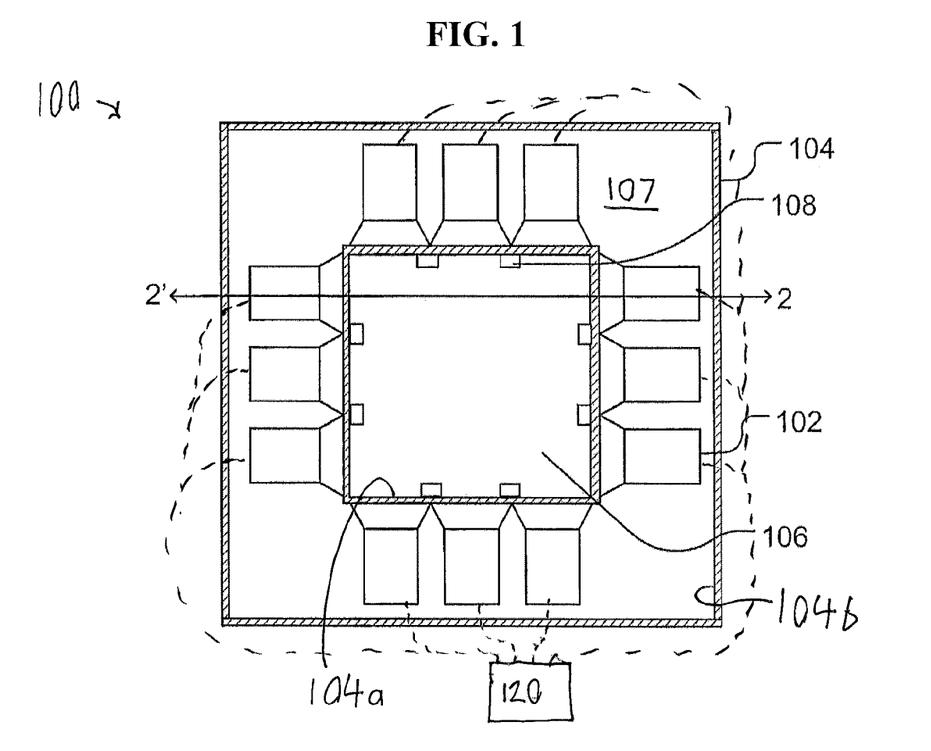
FIG. 1 is a cross-sectional view of an ultrasonic cleaning assembly according to an embodiment of the present invention.
Figure 2:
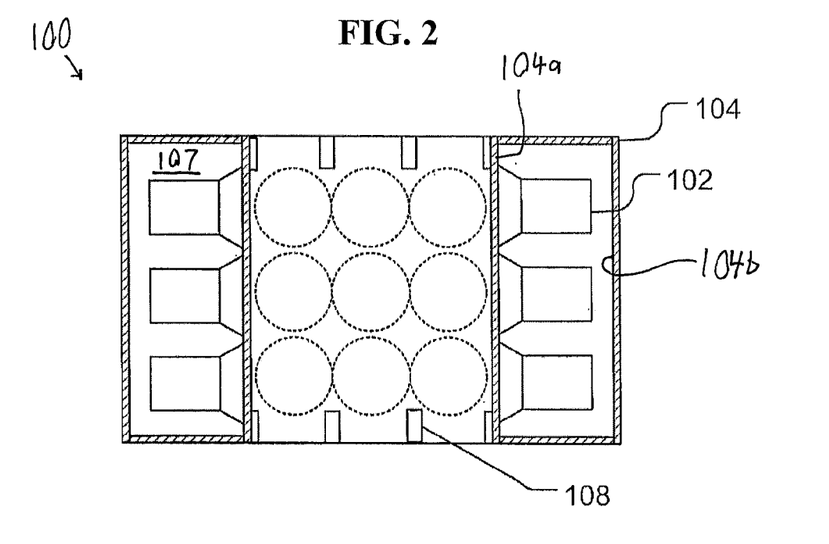
FIG. 2 is a cross-sectional view of the ultrasonic cleaning assembly in FIG. 1, taken along the line 2'-2 in FIG. 1.
Figure 3:
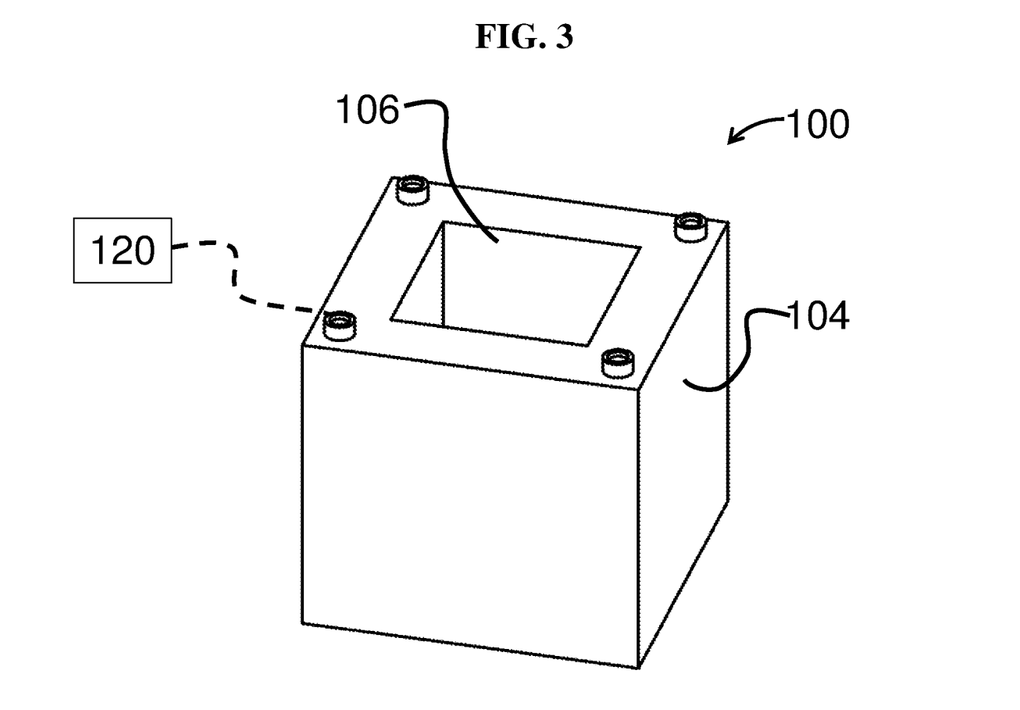
FIG. 3 is a side perspective view of the ultrasonic cleaning assembly in FIG. 1.

FIGS. 1-3 illustrate an ultrasonic cleaning system 100 according to various embodiments. As illustrated in FIGS. 1 and 2, the system 100 includes a modular assembly frame 104 with inner and outer walls 104a, 104b. A central cleaning zone 106 is defined inwardly of the inner walls 104a, and is adapted to receive at least part of an object (e.g., an irradiated nuclear fuel assembly) to be cleaned and working fluid (e.g., water, water within a fuel pool at a nuclear reactor) in which said at least part of the object to be cleaned is immersed. According to various embodiments, the system 100 is used to clean highly radioactive fuel assemblies when both the system 100 and the fuel assembly to be cleaned are disposed in a submerged environment of a nuclear plant (e.g., a nuclear reactor's fuel pool, where irradiated fuel assemblies are stored, the reactor cavity of the plant, and/or the transfer canal of the plant).

A plurality of planar ultrasonic transducers 102 are provided in a water-tight transducer zone 107 that is enclosed by the frame 104 and disposed between the inner and outer walls 104a,b. Horns of the transducers 102 are bonded to the inner wall 104a so that the inner walls 104a form radiating surfaces configured to transmit ultrasonic energy from the transducers 102 through the walls 104a and into the cleaning zone 106. During cleaning of an object (e.g. fuel assembly) in the zone 106, the walls 104a define an interface between the transducers 102 and the working fluid in the zone 106 that permits ultrasonic energy to transmit therethrough but prevents the working fluid in the zone 106 from leaking through the walls 104a and into the transducer zone 107 so as to reach the transducers 102.

During cleaning, at least a portion of the object to be cleaned (e.g., a fuel assembly) is positioned within the zone 106. The system 100 may comprise guides 108 that tend to guide the object to be cleaned into the desired orientation within the zone 106, or conversely guide the system 100 onto the fuel assembly, depending on which object (e.g., the system 100 or fuel assembly) is moved relative to the other. The transducers' ultrasonic energy travels through the inner wall 104a, into the cleaning region 106, and into a nuclear fuel assembly disposed in the region 106 so as to clean the fuel rods of the fuel assembly, as explained in U.S. Pat. No. 8,372,206. The structure and arrangement of the frame 104 and transducers 102 may be similar or identical to any of the assemblies disclosed in U.S. Pat. No. 8,372,206, the entirety of which is incorporated herein by reference. According to various embodiments, the transducers 102 of the system 100 provide a bulk power density to the cleaning region 106 of (1) at least 10, 20, 30, 40, 50, 60, 70, 80, 90, 100, 150, 200, 250, 300, 350, 400, 450, and/or 500 watts/gallon, (2) less than 1000, 900, 800, 700, 600, 500, 400, and/or 300 watts/gallon, (3) between 10 and 1000 watts/gallon, between 100 and 700 watts/gallon, and/or between 200 and 600 watts/gallon, and/or (4) within any range between any two such values.

Applicant discovered that the high-radiation operating environment for the system 100 can weaken the bond between the horns of the transducers 102 and the inner wall 104a to which the horns of the transducers 102 are attached. Such degradation can lead to partial or complete detachment of the transducers 102 from the inner wall 104a, which can impede the transmission of energy from the transducers 102 through the wall 104a and into the cleaning zone 106 where high energy densities are preferred to better clean the nuclear fuel assembly in the zone 106. Applicant therefore endeavored to develop an improved way of attaching the transducers 102 to the inner wall 104a.

Applicant discovered that two adhesives (Permabond PT326 and 3M DP-190) withstood ultrasonic service and also maintained good bond strength after irradiation equivalent to exposure to 900 fuel assembly cleanings ($3\times10^9$ Rem gamma radiation). Neither of these materials were previously known to be suitable for ultrasonic service (e.g., bonding of transducers where ultrasonic energy is transmitted through the adhesive), nor was there reliable information publically available with respect either's performance in high radiation environments (e.g., gamma radiation on the order of at least 100, 500, 1000, $10^4$, $10^5$, and/or $10^6$ Rem/hour, and/or less than $10^8$, $10^7$, $10^6$, and/or $10^5$ Rem/hour, as is common in the operating environment of the system 100 within a reactor's fuel pool when a fuel assembly is in the cleaning zone 106).

These results suggested that PT326 and DP-190 adhesives would be similarly suitable to accomplish the desired improvement in transducer performance. One additional test was performed, in which sample transducers made with each material were irradiated to $1.5\times10^9$ Rem and $3\times10^9$ Rem, and then operated for 200 hours of run-time each, and finally destructively examined to measure the transducer-to-wall bond strength after combined irradiation and ultrasonic service. The PT326 bonded transducers successfully operated for the duration of the 200 hour test runs, and demonstrated good bond integrity when examined. The $1.5\times10^9$ Rem DP-190 bonded transducer completed the 200 hour test run, but lost more than 75% of its bond strength in the process. The $3\times10^9$ Rem DP-190 transducer failed during the 200 hour run.

These tests revealed several unexpected results.

The first unexpected result is that there was a significant improvement in bond strength of the PT326 adhesive following irradiation. The strength of the PT326 bond improved by 30% after $1.5\times10^9$ Rem exposure, and retained nearly 100% of its original strength following $3\times10^9$ Rem exposure, whereas the original adhesive typically used in this application failed after only $1\times10^9$ Rem of exposure. This bond strength was measured using sample specimens (cylinder bonded to a plate) after radiation exposure. The bond strength was measured in shear (torsion along cylinder axis) and in tension along the cylinder axis.

The second unexpected result is that radiation exposure and ultrasonic service can be synergistically damaging to the adhesive material that bonds transducers to walls in ultrasonic cleaning systems, such that an adhesive that maintains a good bond strength following irradiation and is also proven to be suitable for ultrasonic service under normal operating conditions may not be suitable for ultrasonic service AND irradiation. The distinctly different performance of the PT326 and DP-190 adhesives under combined ultrasonic service and irradiation was unexpected given their comparable performance with regard to the effects considered individually.

The properties of PT326 result in superior operating life of the transducer 102 (200% or more improvement in one or more embodiments) and system 100 compared to alternative adhesives previously used to bond transducers to walls in ultrasonic cleaning assemblies.

In addition to Permabond PT326, other polyurethane adhesives may also be used according to various alternative embodiments, including, for example, other two-part polyurethane adhesives. Additionally, use of 3M DP-190 (a two part epoxy adhesive), while not as robust as the PT326, is nonetheless superior to the adhesives previously used for construction of the ultrasonic cleaning assemblies.

According to various embodiments, the bond between the transducers 102 and inner wall 104a (1) effectively transmits ultrasonic energy from the transducers 102 to and through the wall 104a, (2) can withstand the mechanical stress of ultrasonic energy being transmitted therethrough, (3) resists radiation degradation from the high levels of radiation in the system's working environment (e.g., in a nuclear reactor's fuel pool, where irradiated fuel assemblies are stored, or other submerged environments where highly radioactive fuel assemblies are disposed (e.g., in the reactor cavity or transfer canal of the nuclear plan)), and/or (4) can endure long life cycles of use in cleaning nuclear fuel assemblies.

The electronics that power the transducers 102 normally include a power monitoring feature that reports the total electrical power going to the transducer 102. This reported power is an implicit measure of the amount of acoustic energy being radiated into the liquid by the transducer 102. However, Applicant discovered that certain transducer failure modes may result in degraded transmission of acoustic energy to the working fluid without a corresponding reduction in electrical load. Such degraded transmission can occur, for example, when the transducer 102 partially or completely decouples from the wall 104a. Degraded energy transmission can also occur when the adhesive attaching the transducer 102 to the wall 104a is weakened as a result of radiation degradation and dampens the transmission of ultrasonic energy from the transducer 102 to the wall 104a and cleaning zone 106. When this transmission degradation occurs, the reported transducer 102 power can remain at 100% even though the effective transmission of energy to the fluid in the cleaning zone 106 is less than 100%. Thus, there could be a situation in which the standard condition monitoring metrics do not adequately reflect the acoustic conditions of the working fluid in the cleaning zone 106, such that the object being cleaned (e.g., a nuclear fuel assembly) is not being cleaned as well as what is being reported by the standard monitoring metrics report.

According to one or more embodiments, the system 100 includes a transducer monitor 120 that detects faulty or transmission-degraded transducers 102. The monitor 120 operatively connects to each of the transducers 102 via appropriate cabling (e.g., the respective power cables that provide electric power to each of the transducers 102). The monitor 120 runs a diagnostic test on an energy transmitting subset of one or more of the transducers 102 by (1) energizing the transmitting subset to produce and transmit ultrasonic energy in the same manner as when the system 100 is used to clean an object (e.g., a nuclear fuel assembly), and (2) using a discrete detecting subset of one or more of the transducers 102 as ultrasonic energy detectors to detect the amount of electrical energy being effectively converted to acoustic energy in the cleaning zone 106 by the transmitting subset. The transducers 102 can be used in an energy detecting mode using known techniques for detecting ultrasonic energy via ultrasonic transducers. Such known techniques result in electrical signals from the detecting transducers 102 that are indicative of an amount of ultrasonic energy being delivered to the cleaning zone 106. The monitor 120 is thus able to identify transmission degradation (e.g., caused by transducer 102 decoupling, or weakening of the adhesive attaching the transducer 102 to the wall 104a) by detecting the energy that is delivered by the transmitting subset to the cleaning zone 106, rather than by detecting the electrical energy supplied to the transmitting subset.

The monitor 120 can test all of the transducers 102 by sequentially operating different subsets of the transducers 102 in different combinations of transmitting and detecting modes. Thus, each transducer 102 is sometimes operated in its transmitting mode and sometimes operated in its detecting mode.

According to one or more embodiments, one transducer 102 at a time is operated in the transmitting mode such that the first subset of transducers 102 is a single transducer 102. According to other embodiments, a subset of 2, 3, 4, 5, or more transducers 102 are simultaneously operated in their transmitting modes.

Similarly, according to one or more embodiments, the detecting subset can be a single transducer 102. However, according to alternative embodiments, the detecting subset includes 2, 3, 4, 5, or more transducers 102. According to one or more embodiments, the detecting subset includes all of the transducers 102 other than the subset being operated in the transmitting mode.

According to various embodiments, the transmitting subset and detecting subset are disposed on opposite sides of the frame 104 from each other. As a result, during the diagnostic test, the horn of the transmitting transducer 102 is aimed toward the horn of the detecting transducer 102. For example, when the three transducers 102 on the left side of FIG. 1 are tested and used in their transmitting mode, the three transducers on the right side of FIG. 1 can be operated as the detecting subset for that test, and vice versa. The same can be done for the three transducers 102 on the top of FIG. 1 relative to the three transducers 102 on the bottom of FIG. 1. Such opposing transducers 102 may be well suited to detect transmission degradation from opposing transducers 102 because ultrasonic energy tends to travel from one to the other, which therefore results in a high signal-to-noise ratio. However, according to various alternative embodiments, the transmitting and detecting transducers 102 are disposed, relative to each other, in positions other than on opposite sides of the frame 104 from each other. For example, according to various embodiments, the transmitting transducer(s) 102 may be disposed: (1) adjacent to the receiving transducer(s) 102 on a single side of the frame 104, (2) diagonal to the receiving transducer(s) 102 so that the transmitting and receiving transducers 102 are on adjacent walls (e.g., offset by 90 degrees from each other), (3) in any other position relative to the receiving transducer(s) 102, and/or (4) in a combination of different relative spatial arrangements (e.g., some transducers 102 on opposite walls, others on the same or adjacent walls). While various of such options may decrease the strength of the signal received by the receiving transducer(s) 102, such positioning may nonetheless beneficially facilitate greater flexibility in selecting different transmitting/receiving transducer(s) 102 at different times to facilitate better identification of where the degradation occurred (e.g., which transducer's mounting is degraded, which transducer is malfunctioning, etc.).

According to various embodiments, the monitor 120 may store baseline diagnostic data (e.g., in a memory of the monitor 120) for particular combinations of transmitting and detecting subsets of transducers 102. For example, the monitor 120 may collect data from each detecting subset for each transmitting subset at a time when it is known that the transducers 102 are properly coupled and capable of delivering full ultrasonic power to the cleaning zone 106 (and conversely detecting full power). The monitor 120 can then compare subsequent diagnostic data to that baseline to identify transmission degradation in the transmitting subset.

The ability of a detecting transducer 102 to detect energy delivered by other transducer(s) 102 to the cleaning zone 106 is also impaired by a degraded bond between the detecting transducer 102 and the wall 104a. If the bond is weakened, the detecting transducer 102 will detect less energy than is actually being received in the cleaning zone 106. Accordingly, the electric signals received from the detecting transducers 102 can help to detect transmission degradation both in the transmitting transducers 102 and the detecting transducers 102. As explained in greater detail below, the monitor 120 runs a plurality of different tests using different combinations of detecting and transmitting transducers 102 so as to help the monitor 120 to distinguish between (1) impaired energy transmission from the transmitting transducers 102 to the zone 106, and (2) impaired detection of such energy by the detecting transducers 102.

According to various embodiments, the monitor 120 may use a large number of combinations of transmitting subsets and detecting subsets in a large series of diagnostic tests. Each transducer 102 may be included in multiple transmitting subsets and/or multiple detecting subsets. The monitor 120 can compare the diagnostic data for multiple combinations so as to adjust the baseline data to account for differences in ambient operating conditions during the diagnostic tests.

The use of different sequential combinations of transmitting and detecting transducers 102 can also help in identifying whether a reduced energy reading results from transmission degradation in the transmitting transducer(s) 102 or detecting degradation in the detecting transducer(s) 102.

During cleaning cycles, all of the transducers 102 are typically operated simultaneously in transmitting mode to increase the cleaning energy delivered to the cleaning zone 106. According to various embodiments, the monitor 120 runs the diagnostic tests on the transducers 102 between such cleaning cycles. However, according to alternative embodiments, the diagnostic tests can be run during a cleaning operation by operating a subset of the transducers 102 in the detecting mode, even though doing so reduces the ultrasonic energy being delivered to the object being cleaned (i.e., because some of the transducers 102 would be operated in their detecting mode and not, therefore, deliver cleaning energy to the cleaning zone 106).

In the illustrated embodiment, the monitor 120 is diagrammatically shown as being physically separate from the frame 104. In such embodiments, the monitor 120 may connect to the transducers 102 via appropriate wiring/cabling including the power cables that provide electric power to the transducers 102. The monitor 120 may be located with the transducer power supplies for the transducers 102. The monitor 120 may be incorporated into the transducers 102. Alternatively, the monitor 120 may be disposed inside the transducer zone 107.

The monitor 120 may store data from historical diagnostic tests of the transducers 102 to facilitate detection of degradation over time/cleaning cycles of the system 100.

According to various embodiments, the monitor 120 is used to identify other acoustic conditions of the working fluid that affect energy transmission during the diagnostic test (e.g., a dissolved gas concentration in the working fluid, a temperature of the working fluid, a hydrostatic pressure of the working fluid, a suspended particulate loading in the working fluid, or a fluid property (e.g., vapor pressure) of the working fluid, etc.). According to various embodiments, the use of multiple combinations of overlapping sets of detecting and transmitting subsets helps the monitor to detect such non-transducer-dependent factors. The impact of such non-transducer-dependent factors can then be filtered out so that the monitor 120 can focus on transducer-dependent changes that would indicate either (1) transmission degradation resulting from a weakened or broken bond between the transducer 102 and wall 104a, or (2) weakened energy generation by the transmitting transducer 102.

According to various embodiments, the monitor 120 can alternatively be used to characterize properties of the working fluid in the cleaning zone 106, for example, by filtering out the effects of transducer-specific transmission degradation (e.g., via weakened bonds of faulty transducers). The detected properties of the working fluid may include dissolved gas content, which affects cavitation intensity and thus energy attenuation through the working fluid. According to various embodiments, the detected properties may additionally and/or alternatively comprise any one or more acoustic conditions of the working fluid that affect energy transmission during the diagnostic test (e.g., a dissolved gas concentration in the working fluid, a temperature of the working fluid, a hydrostatic pressure of the working fluid, a suspended particulate loading in the working fluid, or a fluid property (e.g., vapor pressure) of the working fluid, etc.)

According to various embodiments, the system 100 may be used to degas the working fluid in the cleaning zone 106 before the working fluid is used during a cleaning cycle. Such degassing may be accomplished by the transducers 102, which may be operated to direct energy into the working fluid in the cleaning zone 106 to drive gasses from the working fluid (e.g., water). The monitor 120 may be used during such degassing (or during intermittent stops between such degassing) to detect when the fluid has been sufficiently degassed to facilitate good cleaning of the object (e.g., nuclear fuel assembly) to be inserted into the cleaning zone 106.

According to various embodiments, the monitor 120 may comprise a computer, power management equipment to control the power being delivered to the transducers 102, A/D converters to receive and convert the detection signals received from individual transducers 102 (when running in energy detection mode) and provide such signals to a processor of the computer of the monitor 120, data storage, a user interface to enable the user to control the system 100 and monitor 120, a display, and an audible indication system (e.g., speakers).

In some embodiments, the computer of the monitor 120 may comprise one or more computing devices that are programmed to perform the functions described herein. The computing devices may include one or more physical processors or other processors programmed with one or more computer program instructions, and/or other components. The computing devices may include communication lines or ports to enable the exchange of information with a network (e.g., Ethernet, internet, etc.) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together to provide the functionality attributed herein to the monitor 120. For example, the computing devices may be implemented by a cloud of computing platforms operating together as the computing devices.

The data storage of the monitor 120 may comprise non-transitory storage media that electronically stores information. The electronic storage media of the electronic storages may include one or both of system storage that is provided integrally (e.g., substantially non-removable) with the computer of the monitor 120 or removable storage that is removably connectable to the computer via, for example, a port (e.g., a USB port, a firewire port, etc.) or a drive (e.g., a disk drive, etc.). The data storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The data storage may include one or more virtual storage resources (e.g., cloud storage, a virtual private network, and/or other virtual storage resources). The data storage may store software algorithms, information determined by the processors of the computer, information received from user computing platforms, or other information that enables the computer to function as described herein.

The processor(s) of the computer of the monitor 120 may be programmed to provide information processing capabilities in the computer. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of the monitor 120, or other subsystems. The processors may be programmed to execute computer program instructions by software; hardware; firmware; some combination of software, hardware, or firmware; and/or other mechanisms for configuring processing capabilities on the processors. It should be appreciated that the description of the functionality provided by the monitor 120, described herein is for illustrative purposes, and is not intended to be limiting.

According to various embodiments, the monitor 120 includes an information output device that provides the results of its diagnostic tests of the transducers 102 to the user in any of a variety of one or more ways. According to one or more embodiments, the monitor 120 provides a signal (e.g., via a network, wireless, or wired connection) to a user-accessible computer (e.g., smartphone, PC, tablet) that indicates the results of the diagnostic tests, and notes whether and which transducers 102 have been identified as faulty (e.g., due to weakening of the bond between the transducer 102 and wall 104a, due to failure of the transducer 102 to generate the desired amount of ultrasonic energy). The signal may also disclose the extent of degradation. According to one or more of these or alternative embodiments, the monitor 120 includes a visual display (e.g., LCD screen, monitor, TV, etc.) that visually displays the results of the diagnostic tests. According to one or more of these or alternative embodiments, the monitor 120 includes an audible warning system (e.g., a speaker) that audibly alerts a user of the results of the diagnostic test (e.g., by identifying a failure of a transducer 102). Additionally and/or alternatively, if the monitor 120 determines that the energy transmission degradation in the system 100 exceeds a predetermined threshold (e.g., 5, 10, 15, 20, 25, 30, 35% reduction in the energy expected to be delivered to the cleaning zone), the monitor 120 may alert the user via the information output device and prevent the system 100 from being used for cleaning cycles until the energy transmission degradation issue has been alleviated. The monitor 120 may prevent the system 100 from operating when degraded so as to avoid insufficient cleaning of the objects (e.g., nuclear fuel assemblies) being cleaned by the system 100.

If the diagnostic tests indicate that transmission degradation for a transducer 102 or combination of transducers 102 exceeds a predetermined threshold (e.g., 5, 10, 15, 20%), the monitor 120 may provide information to the user via the output device (e.g., via the display, an audible warning, information transferred to a separate user-accessible computer) that one or more transducers 102 should be attached more securely to the wall 104a, fixed, and/or replaced, depending on whether further analysis of the affected transducers 102 indicates that the degradation was caused by a weak transducer/wall bond or by a fault within the transducer 102 itself.

Figure 4:
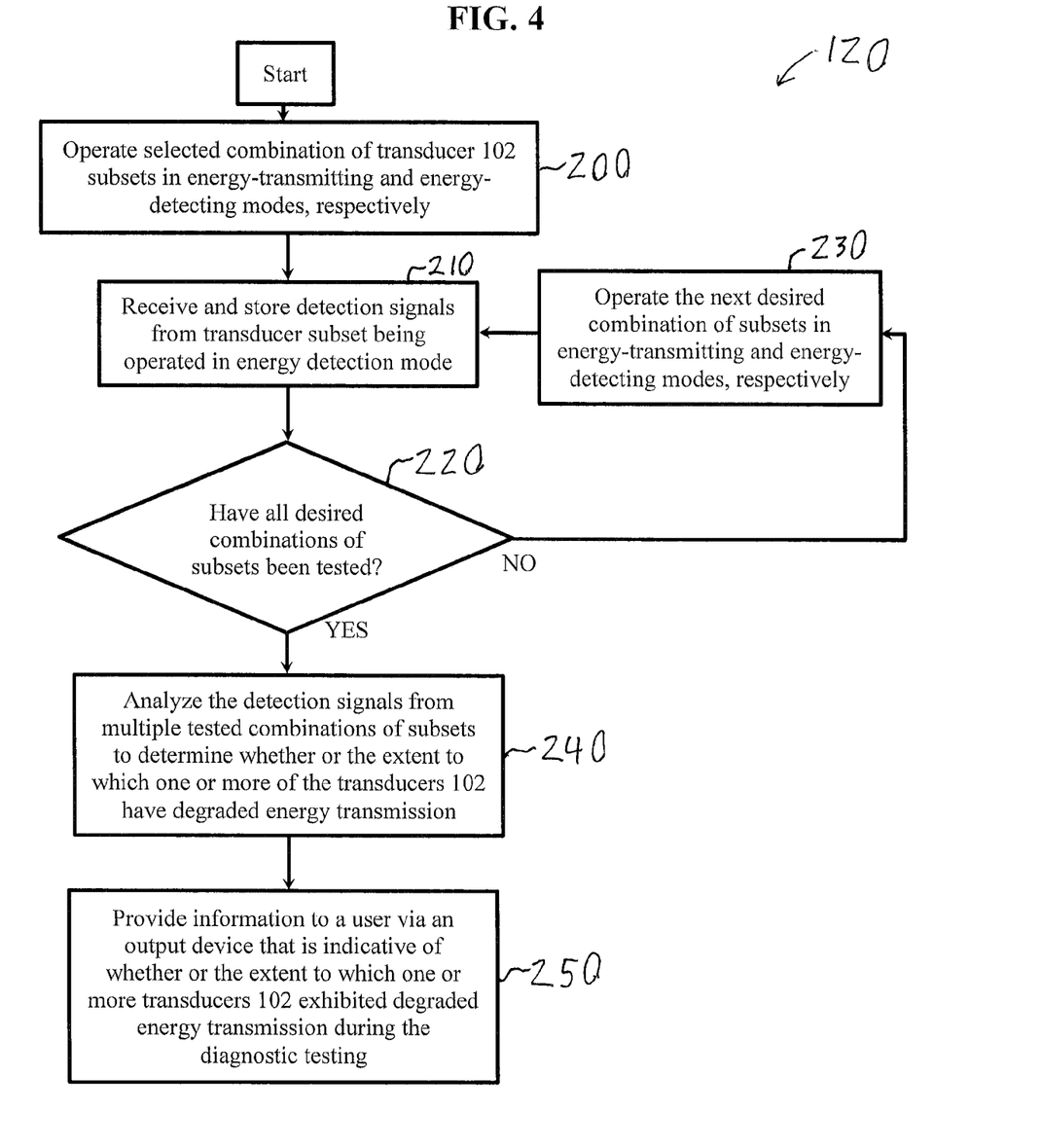
FIG. 4 is a flowchart of the operation of a transducer monitor according to one or more embodiments of the ultrasonic cleaning assembly in FIG. 1.

According to one or more embodiments, the computer of the monitor 120 uses the algorithm/flowchart shown in FIG. 4 to perform a series of diagnostic tests on a plurality of transducers 102. This algorithm may be implemented as a program/code that is implemented by the processor(s) of the computer of the monitor 120. Alternatively, the algorithm may be implemented as a digital or analog circuit. According to various embodiments, the algorithm may vary the transmitting power and/or frequency (e.g., different frequencies near the transducer's resonant frequency) of the transmitting transducer 102 over time and monitor how such power and/or frequency changes affect the signal received by the receiving transducer(s). For example, the algorithm may first cause the transmitting transducer 102 to transmit at 100% power, and subsequently cause the transmitting transducer 102 to transmit at 50% power. The resulting power and/or frequency based differences in the signals received by the receiving transducer(s) 102 may indicate a particular degradation mode or problem. For example, transducer/wall adhesive degradation may be result in a relatively more drastic reduction in transmitting power when the transmitting transducer 102 is operated at a particular power level or frequency than when operated at a different power level or frequency.

At step 200, the monitor 120 operates a selected combination of transducer 102 subsets in transmitting and detecting modes, respectively. At step 210, the monitor 120 then receives and stores detection signals from the transducer 102 subset being operated in energy detection mode. At this step, the monitor 120 may also collect data from the transmitting transducers 102 (e.g., relating to the transmitting transducer's own operation such as data reflecting the transducer's effort to maintain a target power level) to facilitate direct comparison of the signals. At step 220, the monitor determines whether all desired combinations of transducer 102 subsets have been tested such that the monitor 120 has received and stored detection signals for all desired combinations. If not, the algorithm proceeds to step 230, where the monitor 120 operates the next desired combination of subsets in transmitting and detecting modes, respectively, and proceeds back to step 210. Over the course of the diagnostic tests performed by the monitor 120 at steps 200-230, one, a plurality, most, or all of the transducers 102 may be alternatingly used in each of the transmitting and detecting modes. Thus, over different diagnostic tests at steps 200-230, one, several, or all of the transducers 102 will be operated in each mode (energy transmitting and energy detecting).

Once all desired combinations of transducer 102 subsets have been tested, the algorithm proceeds to step 240, where the monitor 120 analyzes the detection signals from multiple tested combinations of subsets to determine whether or the extent to which one or more of the transducers 102 have degraded energy transmission. According to various embodiments, this analysis may comprise comparing the detected signals to stored baseline signals (e.g., signals obtained during testing when it was known that the transducers 102 were operating properly and fully attached to the walls 104a; predetermined threshold values).

At step 250, the monitor 120 provides information to a user via an output device (e.g., the above-discussed display, a speaker, a signal transmitted to a computer) that is indicative of whether or the extent to which one or more transducers 102 exhibited degraded energy transmission during the diagnostic testing According to various embodiments, each time the monitor 120 conducts the diagnostic tests, the monitor 120 assesses the transmission degradation of each of the transducers 102 of the system 100. Alternatively, each time the monitor 120 conducts the diagnostic tests, the monitor 120 may assess only some of the transducers 120, with different series of diagnostic tests assessing sequential portions of the transducers 102. Assessment of all transducers 102 is preferred during each series of diagnostic tests, but fewer than all of the transducers 102 may be assessed, for example if available diagnostic time is limited (e.g., between cleanings of a series of nuclear fuel assemblies).

In the illustrated embodiment, the monitor 120 is used to diagnose transducer energy transmission degradation in transducers 102 of an ultrasonic cleaning system 100. However, according to alternative embodiments, the monitor 120 may be used to diagnose transducer energy transmission degradation in any other system that includes multiple ultrasonic transducers.

The foregoing illustrated embodiments are provided to illustrate the structural and functional principles of various embodiments and are not intended to be limiting. To the contrary, the principles of the present invention are intended to encompass any and all changes, alterations and/or substitutions thereof (e.g., an alterations within the spirit and scope of the following claims).

What is claimed is:
1. A submersible ultrasonic cleaning system comprising:
a frame assembly comprising inner walls, wherein a cleaning zone is disposed inwardly of the inner walls, wherein the cleaning zone is configured to accommodate a nuclear fuel assembly therein; and
a plurality of ultrasonic transducers, each of which is bonded to one of the inner walls with a polyurethane adhesive to form a plurality of radiating surfaces, the plurality of radiating surfaces being arranged to transmit ultrasonic energy from the plurality of ultrasonic transducers into the cleaning zone,
wherein the submersible ultrasonic cleaning system is configured to be disposed in a submerged environment of a nuclear power plant.
2. The system of claim 1, wherein the polyurethane adhesive comprises a radiation-hardened adhesive.
3. The system of claim 1, wherein the plurality of ultrasonic transducers are configured to transmit a bulk power density to the cleaning zone of at least 10 watts/gallon.
4. The system of claim 1, wherein the frame assembly further comprises a plurality of outer walls that connect to the inner walls and enclose the plurality of ultrasonic transducers in a water-tight transducer zone disposed between the inner and outer walls.
5. The system of claim 1, wherein the cleaning system is disposed in a submerged environment of a nuclear power plant.
6. The system of claim 1, wherein the cleaning system is configured to use the plurality of ultrasonic transducers to clean the nuclear fuel assembly.

7. The system of claim 1, wherein the inner walls separate the plurality of ultrasonic transducers from the cleaning zone.

8. The system of claim 1, wherein the inner walls define the radiating surfaces.

9. The system of claim 8, wherein each of the plurality of ultrasonic transducers are directly bonded to one of the inner walls with the polyurethane adhesive such that the inner walls form the plurality of radiating surfaces.

10. The system of claim 1, wherein the polyurethane adhesive comprises a radiation-resistant adhesive.

11. A submersible ultrasonic cleaning system comprising:
   a frame assembly comprising inner walls, wherein a cleaning zone is disposed inwardly of the inner walls, wherein the cleaning zone is configured to accommodate a nuclear fuel assembly therein; and
   a plurality of ultrasonic transducers, each of which is bonded to one of the inner walls with a two part epoxy adhesive to form a plurality of radiating surfaces, the plurality of radiating surfaces being arranged to transmit ultrasonic energy from the plurality of ultrasonic transducers into the cleaning zone,
   wherein the submersible ultrasonic cleaning system is configured to be disposed in a submerged environment of a nuclear power plant.

12. The submersible ultrasonic cleaning system of claim 11, wherein the submersible ultrasonic cleaning system is disposed in a submerged environment of a nuclear power plant.

13. The submersible ultrasonic cleaning system of claim 11, wherein the cleaning system is configured to use the plurality of ultrasonic transducers to clean a nuclear fuel assembly.

14. The system of claim 11, wherein the inner walls separate the plurality of ultrasonic transducers from the cleaning zone.

15. The system of claim 11, wherein the inner walls define the radiating surfaces.

16. The system of claim 15, wherein each of the plurality of ultrasonic transducers are directly bonded to one of the inner walls with the two part epoxy adhesive such that the inner walls form the plurality of radiating surfaces.

17. The system of claim 11, wherein the two part epoxy adhesive comprises a radiation-resistant adhesive.

18. The system of claim 11, wherein the plurality of ultrasonic transducers are configured to transmit a bulk power density to the cleaning zone of at least 10 watts/gallon.

19. The system of claim 11, wherein the frame assembly further comprises a plurality of outer walls that connect to the inner walls and enclose the plurality of ultrasonic transducers in a water-tight transducer zone disposed between the inner and outer walls.

* * * * *